United States Patent [19]
Legille et al.

[11] 3,955,693
[45] May 11, 1976

[54] METHOD AND APPARATUS FOR COOLING AND CLEANING THE SEALING SURFACE OF A VALVE

[75] Inventors: Edouard Legille, Luxemburg; René N. Mahr, Howald-Hesperange, both of Luxemburg

[73] Assignee: S.A. des Anciens Etablissements Paul Wurth, Luxemburg, Luxemburg

[22] Filed: June 26, 1974

[21] Appl. No.: 483,404

Related U.S. Application Data

[63] Continuation-in-part of Ser. No. 398,312, Sept. 18, 1973, abandoned.

[30] Foreign Application Priority Data

Sept. 20, 1972 Luxemburg .................. 66125

[52] U.S. Cl. ................. 214/35 R; 137/15; 137/240; 266/176
[51] Int. Cl.² ............... F27B 11/12; F16L 45/00
[58] Field of Search ............ 214/35 R, 36, 152, 37; 266/27; 137/15, 240

[56] References Cited
UNITED STATES PATENTS

| | | | |
|---|---|---|---|
| 3,570,510 | 3/1971 | Tsutsumi | 137/240 |
| 3,679,193 | 7/1972 | Nieboer | 266/27 |
| 3,693,812 | 9/1972 | Mahr et al. | 214/35 R |

*Primary Examiner*—Robert G. Sheridan

[57] ABSTRACT

A method of and apparatus for cooling and cleaning the sealing surfaces of the sealing valves of a material storage hopper which are subjected to the high temperature and pressure within a shaft furnace. The method comprises introducing a cooling medium into the charging installation of the furnace and causing the coolant to continuously impinge upon the sealing valves. The apparatus includes a rotatable sealing flap having a sealing surface of resilient material and a cooling fluid supply conduit for directing a flow of cooling fluid towards the sealing surface of the flap when the flap is in its opened position.

17 Claims, 2 Drawing Figures

METHOD AND APPARATUS FOR COOLING AND CLEANING THE SEALING SURFACE OF A VALVE

CROSS-REFERENCE TO RELATED APPLICATIONS

This application is a continuation-in-part of U.S. application Ser. No. 398,312 filed Sept. 18, 1973, now abandoned.

BACKGROUND OF THE INVENTION

1. Field of the Invention

The present invention relates to a method of and apparatus for cooling and cleaning the lower sealing valves of the storage hoppers of shaft furnace charging installations. More particularly, this invention is directed to cleaning and cooling the sealing valves of a bell-less blast furnace charging installation in which the sealing valves are directly subjected to the temperature prevailing at the furnace throat. This invention is thus generally directed to a novel and improved method and apparatus for sealing the storage hoppers or bins of a shaft furnace charging installation.

2. Description of the Prior Art

On modern high capacity blast furnaces, in place of the hitherto conventional furnace-top distributors comprising a charging hopper arranged on the furnace throat and sealed by means of upper and lower bell-type charge distributors, increasing use is being made of one or more charge material intermediate storage bins which are selectively isolated from the conditions prevailing within the furnace and the ambient atmosphere by sealing valves or flaps. These valves or flaps are removed from the flow of charge material during the furnace charging operation.

U.S. Pat. No. 3,693,812 discloses a bell-less shaft furnace charging installation including a distribution chute, which is rotatable and adjustable in pitch angle, positioned in the blase furnace throat. In the apparatus of U.S. Pat. No. 3,693,812 the charge material or burden is stored in two or more intermediate storage bins or hoppers and is supplied to the distribution chute in controlled quantities, through use of a metering device, via a central feed channel. In the manner known in the art, the storage bins are operated in accordance with a predetermined cycle, i.e., while one of the bins is being filled with charge material the other will be discharging its contents to the central feed channel and thence onto the furnace hearth via the distribution chute.

Prior to each charging operation and before the start of the refilling of a previously discharged storage bin with charge material from the material pit, the pressure in the storage bin to be discharged or filled must be equalized with the pressure existing in the blast furnace throat or with the ambient atmospheric pressure. This requisite pressure equalization is accomplished by supplying blast furnace gas at furnace pressure to the storage bin or releasing this gas to the atmosphere as appropriate. In the interest of sealing the storage bins relative to the blast furnace port or to the atmosphere, the bins are preferably provided with upper and lower sealing valves or flaps.

Due to the relatively large size and weight of the sealing valves, and also as a consequence of the high temperature and other harsh operating conditions encountered in the environment of a shaft furnace, metal-to-metal seals rapidly degrade and will not provide adequate sealing of the high pressures established inside of the furnace after a relatively short operational life. The rapid deterioration of metal-to-metal seals dictates the use of soft or resilient materials to achieve adequate sealing. To insure that the quality of the seal is maintained during operation for a reasonably long period of time, steps must be taken to insure that the sealing surfaces of the sealing flaps of a shaft furnace charging installation are not subjected to erosion induced wear by the charge material. Also, a sealing material which can withstand the heat and pressure stresses of the operating environment must be selected.

The requirement that the sealing surfaces of the valves be protected against erosion induced wear is partially satisfied by insuring that the sealing flaps do not perform a material retaining function; separate flow control members located upstream of the lower sealing valves in the direction of material flow being employed for this purpose. Additionally, in the open condition, during the charging or burdening of the furnace the sealing valve flaps are rotated so as to be completely removed from the material flow path.

A sealing material which satisfactorily withstands, over a sufficiently long operational life, the heat and pressure stresses to which the lower sealing flaps of the storage bins are subjected is not presently available. A furnace charging operation necessarily produces great temperature differences in the region surrounding the lower sealing flaps. During the "dead" time between individual charging operations the blast furnace heat is lead, by convection of the throat gas, to the underside of the lower sealing flaps. The conductivity of the gas, and thus the temperatures to which the sealing flaps are exposed, is increased by the high counterpressure at the throat in modern blast furnaces. During the charging process, however, the temperature in the area of the opened lower sealing flaps falls abruptly as a result of the presence and flow of the charge material which is at the temperature of the ambient atmosphere surrounding the furnace. Due to the large temperature differences and the sudden changes in temperature, sealing materials mounted in or on the lower sealing valves of a blast furnace charging installation could be expected to be considerably stressed and deformed leading to early impairment of the sealing characteristics.

Moreover, the temperature in the blast furnace can vary from the normal operating temperature of 200° to 250°C to 500°C or more. It is even possible that brief temperature surges of approximately 1000°C may occur. As a result of these high temperature influences the sealing material of the lower sealing flap is stressed to its limits and consequently the life and sealing characteristics of the lower flap seal are considerably impaired.

In addition, after each charging operation the storage bins and their discharge channels are filled with very hard and sharp-edged dust particles. These particles cling to the sealing surfaces of the sealing valves, especially when the charging material has a high moisture content. If these particles are not removed they will begin to accumulate between the sealing surfaces on the valve or flap members and their cooperating stationary bearing or seating surfaces. With each closing operation of the sealing flap the sealing material becomes further incrusted with these deposits of dust particles whereby the sealing action is considerably reduced or destroyed after a relatively short period of time.

SUMMARY OF THE INVENTION

The primary objective of the present invention is to lower and keep approximately constant the temperature in the area of the lower sealing flaps of the storage bins of a shaft furnace charging installation whereby commercially available soft or resilient materials can be employed for sealing. A further related objective of this invention is the cleaning and keeping the sealing surfaces of the sealing valves or flaps free, to the extent possible, from deposits of dust and mud.

In accordance with the present invention a gaseous cooling medium is caused to continuously impinge upon or skirt the sealing valves or flaps of a shaft furnace charging apparatus during operation of the furnace. The cooling medium is introduced into the charging installation at a appropriate point between the blast furnace port or top and the lower sealing flaps. The pressure of the cooling medium thus introduced is maintained somewhat higher than the pressure at the furnace throat so that a small flow of cooling medium into the blast furnace will be established and fresh cooling medium can be continuously supplied from outside the furnace.

The introduction of the cooling medium into the furnace charging installation is accomplished in such a manner that the sealing surfaces of the sealing flaps are continuously impinged upon by the cooling medium flow in their open position and during their closing action.

In accordance with a preferred embodiment cleaned and cooled blast furnace gas is employed as the cooling medium. However, it is also possible to use an inert gas as the cooling medium or mixture of inert gas and cleaned and cooled blast furnace gas.

The present invention is accordingly based on the knowledge that it is possible to introduce a certain quantity of a gaseous cooling and cleaning medium into the top of a blast furnace during operation of the furnace without disturbing the ore reduction process which is occurring within the furnace.

BRIEF DESCRIPTION OF THE DRAWING

The present invention may be better understood and its numerous objects and advantages will become apparent to those skilled in the art by reference to the accompanying drawing, which illustrates one embodiment of the invention as applied to a bell-less charging and distribution system for a blast furnace, wherein like reference numerals refer to like elements in the two figures and in which.

DESCRIPTION OF THE PREFERRED EMBODIMENT

Figure 1:
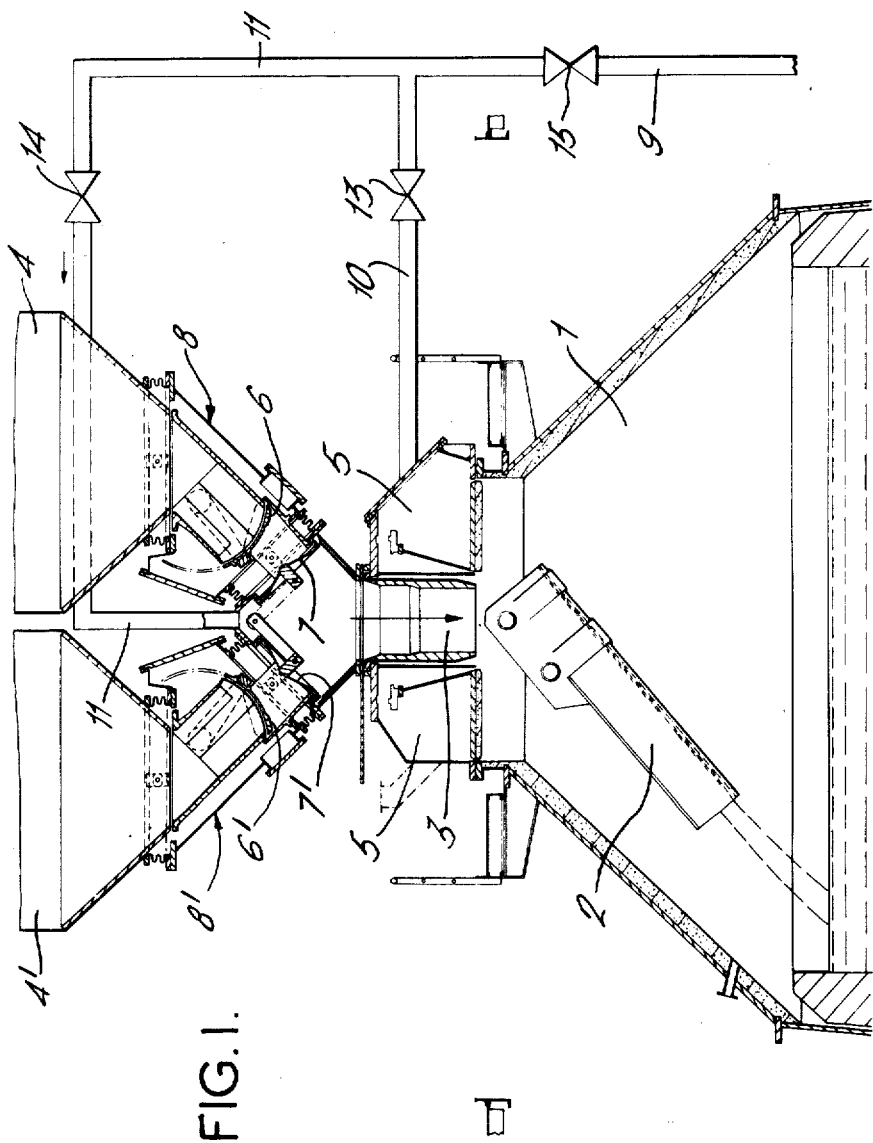
FIG. 1 is a schematic side elevation view, partially in section, depicting a preferred embodiment of the invention.

Referring initially to FIG. 1, the bell-less charging installation shown comprises a distributor chute 2 arranged in the blast furnace top or throat 1, a central feed channel 3 and two intermediate storage bins or hoppers 4 and 4'. The drive for distributor chute 2, which has been omitted from the drawing in the interest of facilitating understanding of the invention, is located in drive chamber 5 and permits chute 2 to be rotated while its pitch angle is independently varied. Communication between the storage bins 4 and 4' and the central feed channel 3 is established through respective discharge channels indicated generally at 8 and 8'. Material retaining and metering members, in the form of dome-like or arcuate adjusting flaps 6 and 6', are provided in respective discharge channels 8 and 8'. Lower sealing flaps or valve members 7 and 7' associated with respective storage bins 4 and 4' are also installed in the discharge channels 8 and 8' downstream, in the direction of charge material flow, from the metering members 6 and 6'.

Cleaned and cooled blast furnace gas and/or inert gas is introduced into the drive chamber 5 in order to clean and cool the drive unit for chute 2. This cooling gas is supplied via conduits 9 and 10. Since a suitable cooling medium is present in the charging installation, this cooling medium may also be used for cooling the components of the lower pressure sealing valves associated with the storage bins 4 and 4'. To this end the main supply conduit 9 is branched and the cooling medium is supplied, in accordance with the present invention, to the vicinity of the two sealing flaps 7 and 7' via conduit 11. In accordance with a preferred mode of operation, the cooling medium is caused to flow constantly around the housing of the cooling flaps so that the housing is correspondingly cooled. The source of the cooling gas is controlled such that the coolant is always at a slightly higher pressure than the counter-pressure at the furnace throat. Thus, in the open position of the sealing flaps 7 and 7', as shown in the case of flap 7' in FIG. 2, the cooling medium flow impinges directly on and flows over the sealing surfaces of the flap thus "working" the flap. During the opening action, and particularly during the closing movement of the sealing flaps 7 and 7', the flow of cooling medium is also directed onto the stationary sealing surfaces; i.e. the valve seats which cooperate with the flaps 7; on the discharge channels 8 and 8'. The manner by which this is accomplished is shown in FIG. 2 and will be discussed in greater detail below.

Also in accordance with the present invention, a separate supply of cooling medium can be provided for each of the different sealing surfaces. Due to the impingement of the cooling medium on the sealing surfaces these surfaces will be kept free, to the largest possible extent, from deposits of the dust and mud; the sealing surfaces being cleaned by the coolant flow during each valve closing operation. For coolant pressure and quantity regulation, regulating valves 13 and 14 are provided respectively in conduits 10 and 11. A main control valve 15 incorporated in main supply conduit 19 serves as a pressure reducer or flow regulator.

A particularly important feature of the present invention is the maintenance of the cooling medium flow even during the charging process. In this manner a continual cooling of the sealing flaps and an immediate removal of particulate matter therefrom will be achieved after each charging process.

Figure 2:
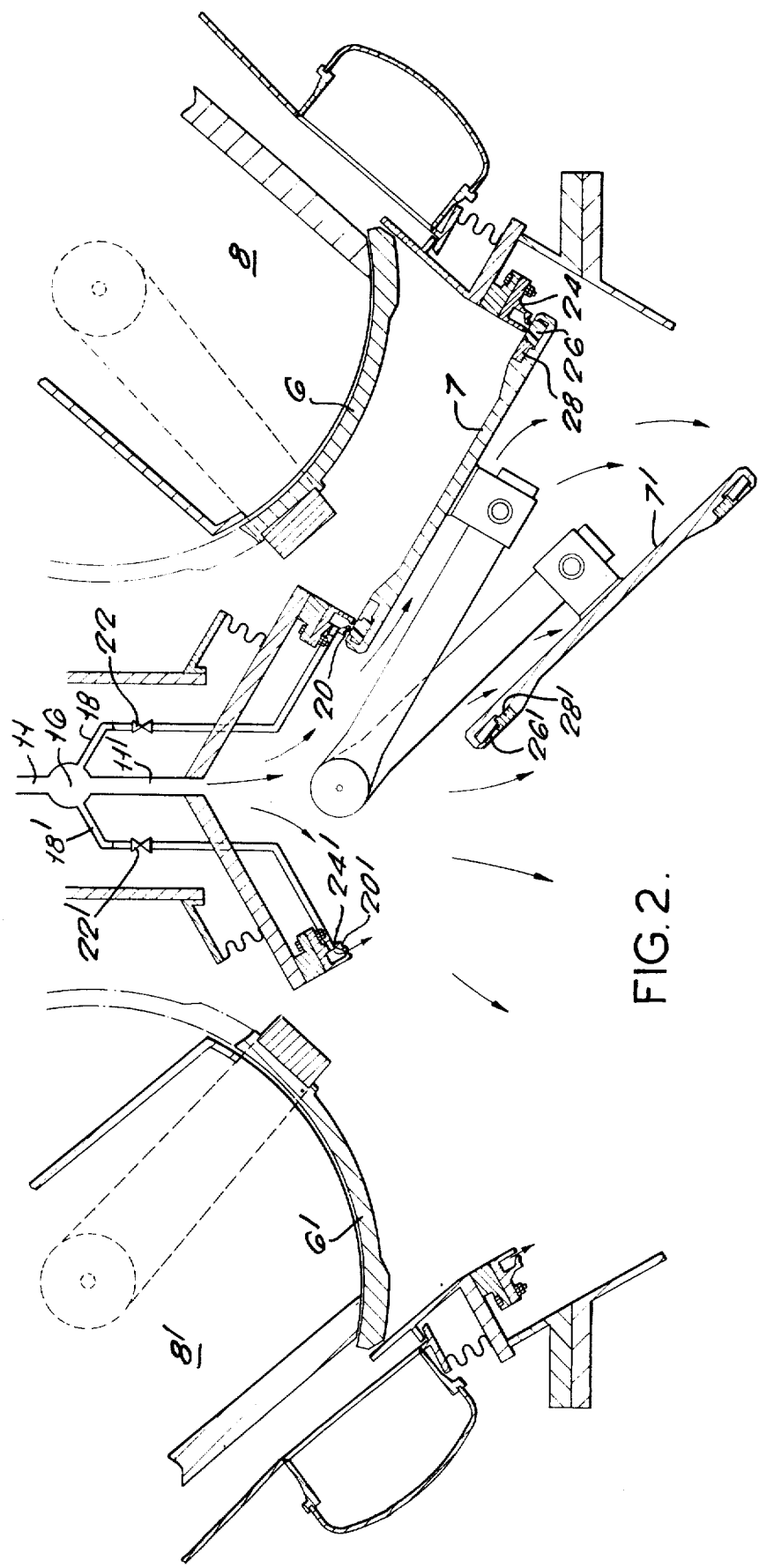
FIG. 2 is an enlarged cross-sectional view of the sealing flaps of the apparatus of FIG. 1, FIG. 2 clearly depicting the delivery and flow of the cooling medium in accordance with the invention.

Referring now to FIG. 2, the lower ends of the discharge channels 8 and 8' wherein are mounted the metering members 6 and 6' and the sealing flaps 7 and 7' are shown on an enlarged scale when compared to FIG. 1. In FIG. 2 the sealing flap 7 is shown in the closed position which it might be caused to assume when the intermediate storage hopper 4 is being refilled with charge material; i.e., when atmospheric pressure and temperature exists within hopper 4 and thus also within the discharge channel 8. Conversely, the sealing flap 7' is shown in the open position. Since the metering member 6' is shown as closed, it may be assumed that sealing flap 7' is shown in the position it would assume just immediately prior to or subsequent to the discharge of the charge in intermediate storage hopper 4' onto the furnace hearth via discharge channel 8' and the distribution chute 2 (not shown in FIG. 2).

The flow of cooling medium over the stationary sealing or valve seat surfaces which cooperate with the sealing flaps 7 and 7' is achieved by means of installing a plenum chamber 16 in the branch supply conduit 11 and tapping off cooling gas from plenum chamber 16 via further branch conduits 18 and 18'and a continuation 11' of conduit 11. As noted above, in accordance with a preferred embodiment of the invention the flow of coolant onto the stationary resilient sealing members of the sealing valves, indicated respectively at 20 and 20', is necessary only during the opening and closing of the valves and particularly during closing. Accordingly, the conduits 18 and 18' are respectively provided with valves 22 and 22' which may be operated from a remote location.

As may be clearly seen from FIG. 2, the lower ends of the discharge channels 8 and 8' are respectively provided with valve seat defining members 24 and 24'. These valve seat defining members are removably attached to the lower ends of the discharge channels 8 and 8' by means of bolts. The stationary resilient sealing members 20 and 20', which may be comprised of a soft metal, are attached by hard facing to the valve seat members 24 and 24'. Members 24 and 24' are each provided with an annular internal passage which discharges, via a slot, downwardly over the sealing members 20, 20'. Thus, considering the valve which includes movable flap 7', during the opening and particularly during the closing of flap 7' the valve 22' will be open and the coolant gas will be delivered via conduit 11, plenum chamber 16 and conduit 18' to the channel within the valve seat defining member 24' from which it will be discharged through the slot in the valve seat defining member. During this discharge the cooling gas will both cool and clean the sealing material 20' whereby, upon closing of the valve, no particular matter will be wedged between the stationary and movable sealing surfaces. In the embodiment shown, sealing flap 7 is in the closed position and there is accordingly no need for the delivery of coolant gas to the channnel in the valve seat defining member 24 and thus valve 22 will be closed. In accordance with the preferred embodiment, the valve 14 of FIG. 1 will remain open at all times during furnace operation and thus cooling gas will be continuously discharged into the furnace throat via conduit 11, plenum chamber 16 and conduit 11'.

As may also be seen from FIG. 2, the sealing flaps 7 and 7' provide support for annular sealing members such as member 26' on flap 7'. The sealing members 26, 26', which may be comprised of silicon rubber, are retained in position on the sealing flap by means of a retaining ring such as ring 28' of flap 7'. The retaining ring 28 may be comprised of steel and is attached to sealing flaps 7' by means of screws The materials comprising the sealing members 20 and 26, as well as the retaining rings 28, are chosen such that their coefficient or expansion is sufficiently compatible with the other materials employed in the furnace so that the sealing members will be retained in position and will not be "lost" should there be a failure in the coolant supply.

As may be seen by the arrows provided on FIG. 2, the continuous flow of cooling gas discharged into the furnace throat will, because of the pressure differential maintained, flow downwardly over both the open and closed sealing valves thereby continuously cooling and cleaning the movable valve members or flaps 7 and 7'. The amount of cooling gas discharged into the furnace will not, however, be sufficient to have a deleterious effect upon the operation being performed within the furnace.

The present invention greatly reduces the stressing of the sealing material. As a consequence of the resultant increased life of the sealing material the amount of time during which the blast furnace is shut down in greatly reduced. In addition, the sealing of the counterpressure at the furnace throat relative to atmosphere is insured and the blast furnace can be operated with a higher counterpressure.

It is of particular advantage that the temperature in the area of the distributor chute in the blast furnace throat is reduced by the cooling medium flow into the blast furnace throat. The cooling medium, after performing its function of cleanng and cooling the stationary and movable parts of the sealing valves, flows around the distributor chute and keeps a large proportion of the blast furnace dust away from the movable parts of the distributor chute.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A method for cooling and cleaning the sealing surfaces of the sealing valve of a material storage hopper, the hopper comprising a portion of a shaft furnace charging apparatus installed above the throat of the furnace, the method comprising the steps of:

introducing a gaseous cooling medium at a pressure in excess of the pressure existing in the throat of the furnace into the charging apparatus; and continuously directing the thus introduced cooling medium to flow about the sealing valve movable member regardless of the operative state of the valve whereby the introduced cooling medium is continually discharged into the interior of the furnace.

2. The method of claim 1 further comprising the step of:

intermittently causing the thus introduced cooling medium to flow over the stationary sealing surfaces of the sealing valve.

3. The method of claim 2 wherein the step of introducing comprises:

delivering a cleaned and cooled furnace gas to the interior of the furnace charging apparatus.

4. The method of claim 2 wherein the step of introducing comprises:

delivering an inert gas to the interior of the furnace charging apparatus.

5. The method of claim 2 wherein the step of introducing comprises:

delivering a mixture of inert gas and cleaned and cooled furnace gas to the interior of the furnace charging apparatus.

6. The method of claim 2 wherein the step of continuously directing comprises:
guiding the flow of cooling medium so as to impinge directly on the sealing surfaces during the opening and closing of the valve and during the open state of the sealing valve to thereby keep the sealing surfaces free from deposits of dust and mud particles.

7. The method of claim 6 wherein the step of introducing comprises:
delivering a cleaned and cooled furnace gas to the interior of the furnace charging apparatus.

8. The method of claim 2 wherein the step of intermittently causing the cooling medium to flow over the sealing valve stationary sealing surfaces comprises:
diverting a portion of the introduced cooling medium to the interior of the sealing valve seat when the valve is in an open state; and
discharging the cooling medium to the interior of the furnace through the valve seat and over stationary sealing surfaces thereof.

9. The method of claim 6 wherein the step of introducing comprises:
delivering an inert gas to the interior of the furnace charging apparatus.

10. The method of claim 9 wherein the step of intermittently causing the cooling medium to flow over the sealing valve stationary sealing surfaces comprises:
diverting a portion of the introduced cooling medium to the interior of the sealing valve seat when the valve is in an open state; and
discharging the cooling medium to the interior of the furnace through the valve seat and over stationary sealing surfaces thereof.

11. The method of claim 6 wherein the step of introducing comprises:
delivering a mixture of inert gas and cleaned and cooled furnace gas to the interior of the furnace charging apparatus.

12. The method of claim 11 wherein the step of intermittently causing the cooling medium to flow over the sealing valve stationary sealing surfaces comprises:
diverting a portion of the introduced cooling medium to the interior of the sealing valve seat when the valve is in an open state; and
discharging the cooling medium to the interior of the furnace through the valve seat and over stationary sealing surfaces thereof.

13. The method of claim 6 wherein the step of intermittently causing the cooling medium to flow over the sealing valve stationary sealing surfaces comprises:
diverting a portion of the introduced cooling medium to the interior of the sealing valve seat when the valve is in an open state; and
discharging the cooling medium to the interior of the furnace through the valve seat and over stationary sealing surfaces thereof.

14. The method of claim 2 wherein the step of intermittently causing the cooling medium to flow over the sealing valve stationary sealing surfaces comprises:
diverting a portion of the introduced cooling medium prior to discharge into the furnace to the interior of the sealing valve seat when the valve is in an open state; and
discharging the cooling medium to the interior of the furnace through the valve seat and over stationary sealing surfaces thereof.

15. Apparatus for selectively hermetically sealing the material storage hopper of a blast furnace charging installation from the furnace throat comprising:
sealing flap means, said flap means including a rotatable valve member;
valve seat defining means, said seat defining means being positioned on the discharge end of the material storage hopper;
means for moving said sealing flap means valve member between an open position and a closed position in contact with said seat defining means;
a source of a pressurized gaseous cooling medium, said cooling medium source being at a pressure in excess of that existing in the blast furnace throat;
first conduit means for delivering coolant from said source to the furnace charging installation; and
cooling medium distribution means, said distribution means being in fluid communication with said first conduit means and continuously discharging cooling medium into the furnace throat and over said sealing flap means valve member whereby the valve member is continuously cooled and the deposit of particulate matter on the sealing surfaces of said valve member is impeded by the coolant flow during the times when the sealing flap means is in an open position.

16. The apparatus of claim 15 further comprising:
means for intermittently diverting coolant from said distribution means to the stationary sealing surfaces of said valve seat defining means to clean and cool said stationary sealing surfaces when the sealing flap means valve member is in an open position.

17. The apparatus of claim 16 wherein said distribution means comprises:
a plenum chamber having an inlet connection connected to a discharge end of said first conduit means; and
second conduit means for continuously delivering pressurized coolant from said plenum chamber to the interior of the furnace, said second conduit means discharging coolant about said sealing flap means regardless of the position of said valve member, said discharged coolant preventing up-flow of particulate matter in the furnace gases while simultaneously cooling said flap means.

* * * * *